United States Patent [19]
Elko et al.

[11] Patent Number: 5,706,432
[45] Date of Patent: Jan. 6, 1998

[54] MECHANISM FOR RECEIVING MESSAGES AT A COUPLING FACILITY

[75] Inventors: David Arlen Elko, Poughkeepsie, N.Y.; Gottfried Andreas Goldrian, Boeblingen, Germany; Steven Neil Goss, Lake Katrine, N.Y.; Thomas Anthony Gregg, Highland, N.Y.; Audrey Ann Helffrich; Joseph Arthur Williams, both of Poughkeepsie, N.Y.

[73] Assignee: International Business Machines Corporation, Armonk, N.Y.

[21] Appl. No.: 474,574

[22] Filed: Jun. 7, 1995

Related U.S. Application Data

[63] Continuation of Ser. No. 147,697, Nov. 4, 1993, abandoned.

[51] Int. Cl.$^6$ ............................................. G06F 15/167
[52] U.S. Cl. .......................... 395/200.08; 395/200.01; 395/200.13; 395/843; 395/849
[58] Field of Search ...................... 395/200.01, 200.02, 395/200.08, 200.13, 849, 884

[56] References Cited

U.S. PATENT DOCUMENTS

| | | | |
|---|---|---|---|
| 4,396,983 | 8/1983 | Segarra et al. | 395/200.02 |
| 5,179,665 | 1/1993 | Roslund et al. | 395/250 |
| 5,247,616 | 9/1993 | Berggren | 395/200.08 |
| 5,325,492 | 6/1994 | Bonevento et al. | 395/200.08 |
| 5,530,844 | 6/1996 | Phillips et al. | 395/200.08 |
| 5,574,945 | 11/1996 | Elko et al. | 395/200.08 |
| 5,577,211 | 11/1996 | Annapareddy et al. | 395/200.13 |

Primary Examiner—Parshotam S. Lall
Assistant Examiner—Patrice L. Winder
Attorney, Agent, or Firm—Marc A. Ehrlich

[57] ABSTRACT

Computer system processing complexes which can operate actually or apparently synchronously and in parallel or asynchronously in a network have a coupling facility for sending and receiving commands, responses, and data. The memory for the central processing complexes (which is accessible to each of the processing elements) is provided with storage for messages and data for coupling over a communication channel interface. Each of a plurality of processing elements (CPC) has data objects used to maintain state information for shared data in the coupling facility storage. The coupling facility can receive both message commands and data, sending data and responses to messages, and sending and receiving secondary messages. The processing element accessible memory provides a state information buffer control information operation memory block for describing the hardware communication environment associated with the computer system mechanism for storage of state information pertaining to a communications buffer residing in said coupling facility storage. The communication channel has a set of address registers. The system employs four new instructions, PREPARE CHANNEL BUFFER, SIGNAL CHANNEL BUFFER, MOVE CHANNEL BUFFER DATA, and TEST CHANNEL BUFFER, to enable a coupling facility control program to directly manipulate the address registers and control the flow of data, commands and responses between the coupling-facility storage and communication channels for the central processing elements. This provides a direct interface between the coupling facility and an intersystem communication channel for the receipt of messages and data and the related receiving functions.

24 Claims, 9 Drawing Sheets

PREPARE CHANNEL BUFFER (PCB)

MESSAGE OPERATION BLOCK
(MOB)

FIG.7

SIGNAL CHANNEL BUFFER (SCB)

MESSAGE OPERATION WORD (MOW)

FIG.8

MOVE CHANNEL BUFFER DATA (MCBD)

MESSAGE OPERATION WORD (MOW)

MECHANISM FOR RECEIVING MESSAGES AT A COUPLING FACILITY

This application is a continuation of application Ser. No. 08/147,697 filed Nov. 4, 1993, abandoned.

FIELD OF THE INVENTION

The present invention relates to computer systems, and particularly to a computer system having central processing complexes which can operate synchronously and in parallel or asynchronously, such as a network of central processing complexes (CPCs) connected to a coupling facility for sending and receiving commands, responses, and data.

CROSS REFERENCE TO RELATED APPLICATIONS

This application contains subject matter which is related to the following U.S. patent applications, and while of more general applicability is an improvement which can be used in connection with these related inventions. Many of these referenced applications have been published in corresponding European and or Japanese applications as of the filing date of this application, but the numbers thereof have not been identified as of the filing of this application. They are:

"Configurable, Recoverable Parallel Bus" by N. G. Bartow et al, Ser. No. 07/839,657, filed Feb. 20, 1992; U.S. Pat. No. 5,37,608

"High Performance Intersystem Communications For Data Processing Systems" by N. G. Bartow et al, Ser. No. 07/839,652, filed Feb. 20, 1992; U.S. Pat. No. 5,421,803

"Frame-Group Transmission And Reception For Parallel/ Serial Buses", by N. G. Bartow, et al, Ser. No. 07/839,986, filed Feb. 20, 1992; U.S. Pat. No. 5,267,240

"Method and Apparatus for Distributed Locking of Shared Data, Employing a Central Coupling Facility" by D. A. Elko et al, Ser. No. 07/860,808, filed Mar. 30, 1992; U.S. Pat. No. 5,339,427

"Communicating Messages Between Processors And A Coupling Facility" by D. A. Elko et al, Ser. No. 07/860,380, filed Mar. 30, 1992; abandoned "Sysplex Shared Data Coherency Method and Means" by D. A. Elko et al, Ser. No. 07/860,805, filed Mar. 30, 1992; U.S. Pat. No. 5,537,574

"Command Quiesce Function" by D. A. Elko et al, Ser. No. 07/860,330, filed Mar. 30, 1992; U.S. Pat. No. 5,339,405

"Storage Management For a Shared Electronic Storage Cache" by D. A. Elko et al, Ser. No. 07/860,807, filed Mar. 30, 1992; U.S. Pat. No. 5,457,793

"Management Of Data Movement From A SES Cache To DASD" by D. A. Elko et al, Ser. No. 07/860,806, filed Mar. 30, 1992; U.S. Pat. No. 5,493,668

"Command Retry System" by D. A. Elko et al, Ser. No. 07/860,378, filed Mar. 30, 1992; U.S. Pat. No. 5,392,397

"Integrity Of Data Objects Used To Maintain State Information For Shared Data At A Local Complex" by D. A. Elko et al, Ser. No. 07/860,800, filed Mar. 30, 1992; U.S. Pat. No. 5,331,673

"Management Of Data Objects Used To Maintain State Information For Shared Data At A Local Complex" by J. A. Frey et al, Ser. No. 07/860,797, filed Mar. 30, 1992; U.S. Pat. No. 5,388,266

"Recovery Of Data Objects Used To Maintain State Information For Shared Data At A Local Complex" by J. A. Frey et al, Ser. No. 07/860,647, filed Mar. 30, 1992; U.S. Pat. No. 5,394,542

"Message Path Mechanism For Managing Connections Between Processors And A Coupling Facility" by D. A. Elko et al, Ser. No. 860,846, filed Mar. 30, 1992; U.S. Pat. No. 5,181,854

"Method And Apparatus For Notification Of State Transitions For Shared Lists of Data Entries" by J. A. Frey, et al., Ser. No. 07/860,809, filed Mar. 30, 1992; U.S. Pat. No. 5,390,328

"Method And Apparatus For Performing Conditional Operations on Externally Shared Data" by J. A. Frey, et al., Ser. No. 07/860,655, filed Mar. 30, 1992; abandoned "Apparatus And Method For List Management in A Coupled DP System" by J. A. Frey, et al., Ser. No. 07/860, 633, filed Mar. 30, 1992; U.S. Pat. No. 5,410,695

"Interdicting I/O And Messaging Operations In A Multi-System Complex" by D. A. Elko, et al., Ser. No. 07/860,489, filed Mar. 30, 1992; U.S. Pat. 5,394,554

"Method and Apparatus for Coupling Data Processing Systems" by D. A. Elko, et al., Ser. No. 07/860,803, filed Mar. 30, 1992. U.S. Pat. No. 5,317,739

The following related applications are unpublished:

"Quiesce and Unquiesce Function for Intersystem Channels", by Nell G. Barlow, et al., Ser. No. 08/071,154, filed Jun. 1, 1993; U.S. Pat. No. 5,481,738

"Configurable, Recoverable Parallel Bus", by Nell G. Barrow et al, Ser. No. 08/071,146, filed Jun. 1, 1993; U.S. Pat. No. 5,509,122

"Frame Group Transmission and Reception for Parallel/ Serial Buses", by Nell G. Barlow, et al, Ser. No. 08/071,115, filed Jun. 1, 1993; U.S. Pat. No. 5,455,831

"Concurrent Maintenance of Degraded Parallel/Serial Buses", by Kenneth J. Fredericks et al, Ser. No. 08/070,587, filed Jun. 1, 1993; U.S. Pat. No. 5,418,939

"Null Words for Pacing Serial Links to Driver and Receiver Speeds", by Daniel F. Casper et al, Ser. No. 08/071,150, filed Jun. 1, 1993. U.S. Pat. No. 5,548,623

The following applications are filed concurrently herewith:

"Improved Skew Measurement for Receiving Frame-Groups", by T. A. Gregg, et al, Ser. No. 08/147,701, filed Nov. 4, 1993; U.S. Pat. No. 5,425,020

"Suspending, Resuming, and interleaving Frame-Groups", by T. A. Gregg, et al, Ser. No. 08/148,133, filed Nov. 4, 1993; and abandoned "Frame-Group Reception and Processing", by T. A. Gregg, et al, Ser. No. 08/147,702, filed Nov. 4, 1993 abandoned.

"A Message-Dispatching Mechanism for Messages Received at a Coupling Facility", by D. A. Elko, et al, Ser. No. 08/147,703, filed Nov. 4, 1993, pending These co-pending applications and the present application are owned by one and the same assignee, International Business Machines Corporation of Armonk, N.Y.

The descriptions set forth in these co-pending applications are hereby incorporated into the present application by this reference.

REFERENCES USED IN THE DISCUSSION OF THE INVENTION

During the detailed description which follows the following works will be referenced as an aid for the reader. These additional references are: U.S. Pat. Nos. 5,003,558 and 5,025,458 which relate to a channel for synchronizing and decoding of serial data transmission.

These additional references are incorporated by reference.

BACKGROUND OF THE INVENTION

An alternative to the present invention relies on existing mechanisms within the I/O subsystem to perform these functions. In particular, the I/O processor, henceforth referred to as the auxiliary processor, is signalled by the intersystem channels via a channel communication area (CCA) when a command arrives in the link buffer, moves the command and accompanying data to a preassigned location in the coupling facility storage, and when completed, signals the coupling facility via a subchannel that a command has arrived. In a similar fashion each of the other functions related to message reception; sending data, sending responses, sending secondary messages, and receiving secondary responses, is performed by the intervention of the auxiliary processor between the coupling facility and the intersystem channel.

The use of an auxiliary processor in the receiving path adds delays in the overall message execution time due to the extra processing required to signal the auxiliary processor, and due to the pathlength of the microcode executing in the auxiliary processor. Additionally, the auxiliary processor completes the receive function before signalling the coupling facility, so the start of message execution is delayed and serialized by data transfer. Also, the data location in the coupling facility is a temporary staging area for the data prior to its movement into the coupling facility structure whose storage allocation is controlled by the coupling facility; thereby the data must be moved twice on each transfer. Finally, the number of auxiliary processors is generally much smaller than the number of central processing units (CPUs) available to the coupling facility, so the auxiliary processors represent a bottleneck for message transfers in and out of the coupling facility and limit the overall capacity of the coupling facility to handle message functions.

SUMMARY OF THE INVENTION

We provide a network of central processing complexes, (CPCs or processors), which are coupled by a facility, in which each CPC has data objects used to maintain state information for shared data in the coupling facility storage, and more particularly provides a mechanism in the coupling facility for receiving message commands and data, sending data and responses to messages, and sending and receiving secondary messages.

The shortcomings of the prior art are overcome by the addition of an explicit interface between the intersystem channel and the coupling facility that allows the auxiliary processor to be removed from the receiving function. In particular, a channel buffer is created with state information pertaining to the channel buffer residing in coupling-facility storage, a set of address registers are placed in the intersystem channel, and a set of four instructions: PREPARE CHANNEL BUFFER, SIGNAL CHANNEL BUFFER, MOVE CHANNEL BUFFER DATA, and TEST CHANNEL BUFFER, are provided to allow the coupling facility control program to directly manipulate the address registers and control the flow of data, commands and responses between the coupling-facility storage and the intersystem channel.

It is a primary objective of the present invention to provide a direct interface between the coupling facility and the intersystem channel that does not rely on the use of an intervening auxiliary processor, the channel communication area, or subchannels for the receipt of messages and data and the related receiving functions.

It is another objective of the present invention to allow the message command to be moved by the intersystem channel directly into the coupling facility storage.

It is another objective of the present invention to allow the command execution to begin prior to the arrival of the data for a write command, or correspondingly, to allow the data on a read command to begin transfer on the link prior to sending the response.

It is another objective of the present invention to allow the coupling facility to specify the address of the data in a storage structure directly to allow the data transfer to be accomplished without the need of a second movement of the data within coupling facility storage.

It is another objective of the present invention to allow the response to a secondary message command to be discarded by the intersystem channel following the signalling of its arrival.

BRIEF DESCRIPTION OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings in which:

DESCRIPTION OF THE PREFERRED EMBODIMENT

Figure 1:
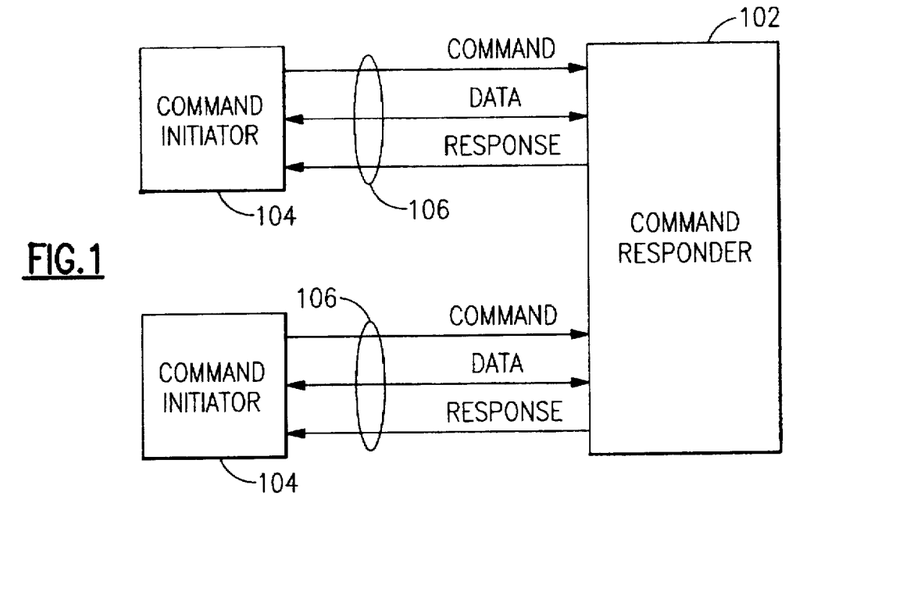
FIG. 1 is a block diagram for describing a general environment for practicing the present invention.

The block diagram of FIG. 1 depicts a generalized environment which can implement the present invention to advantage. It is comprised of a command responder 102 that responds to commands received from one or more command initiators 104 over one or more links 106. The actual configuration of a link 106 can take a number of forms. The link 106 could be a large parallel bus or a fiber optic pair that transmit in serial fashion or a bundled number of such links. In any case, the command responder 102 will receive a command to be executed at the request of a command initiator 104, with or without data, and provide a response back, with or without data. There can be a single command initiator 104 that transmits a plurality of commands in sequence, or more than one initiator 104 as shown.

Figure 2:
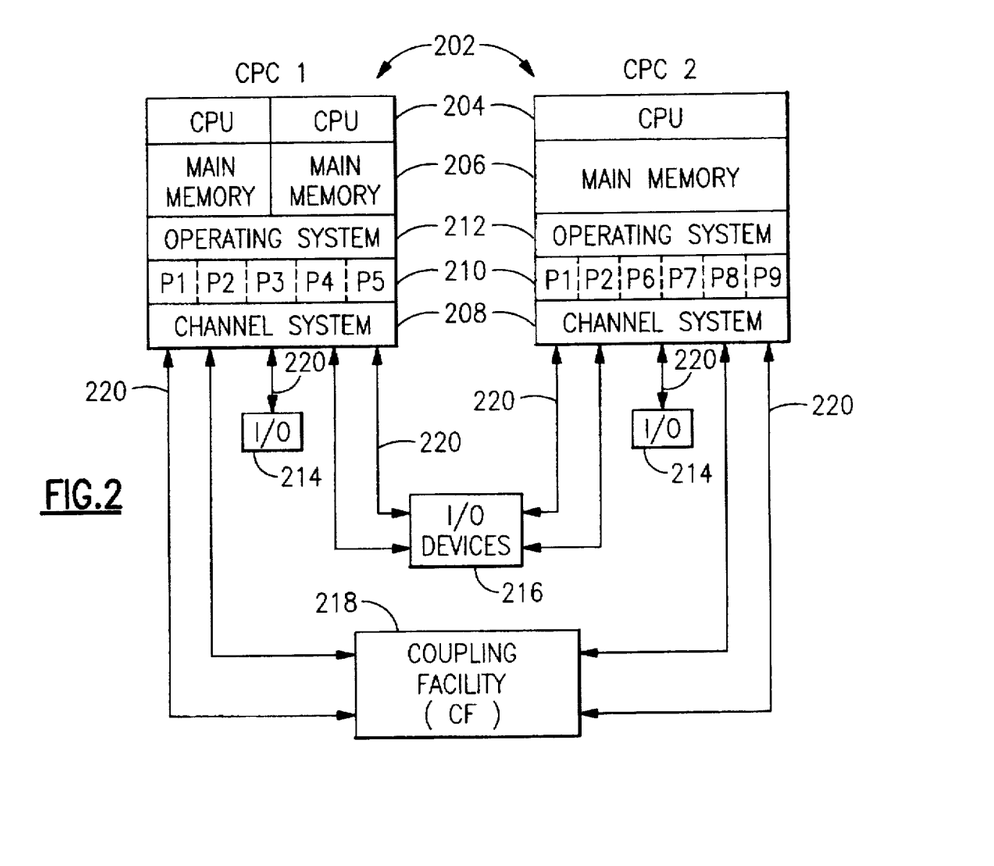
FIG. 2 is a block diagram of a data processing system complex that incorporates the present invention to provide shared usage of system-wide data and control structures.

The block diagram of FIG. 2 provides more detail of a preferred environment for practicing the present invention. It depicts the coupling together of at least two autonomous data processing systems into a system complex (Sysplex) that exhibits a single system image to a user. Autonomous data processing systems 202 are designated as Central Processing Complex (CPC) 1 and 2. CPC 1 and 2 can each be an International Business Machines ES/9000 data processing system.

An ES/9000 data processing system 202 is comprised of one or more Central Processing Units (CPU) 204, a main memory 206 and a channel system 208. Main memory 206 stores data which is manipulated by a plurality of stored application or utility programs 210 (P1–P9), all under the control of an operating system 212 such as the IBM MVS/SP control program. In a Sysplex environment, where fault tolerance and/or increased performance is desired, some of the programs 210 such as P1 and P2 may be duplicated in the systems 202.

The channel system 208 is comprised of a plurality of channels which connect each system 202 with various peripheral units. Certain of the peripheral units may be various I/O units 214 such as magnetic tapes, printers, direct access storage devices (DASD), or communication control units to provide connection of user terminals for example. Some I/O devices 216 may be shared by the two systems 202. The channel systems 208 are also shown in FIG. 2 to be connected to a Coupling Facility 218 (cf) to be more fully described as part of the preferred embodiment of the present invention.

Comparing FIG. 2 with the previous discussion of FIG. 1, the command responder 102 would be cf 218 or the shared I/O devices 216. The links 106 of FIG. 1 are the paths 220 of FIG. 2. In FIG. 2, a command initiator 104 of FIG. 1 could be viewed as being a system 202, program 210, or a channel within the channel system 208.

Figure 3:
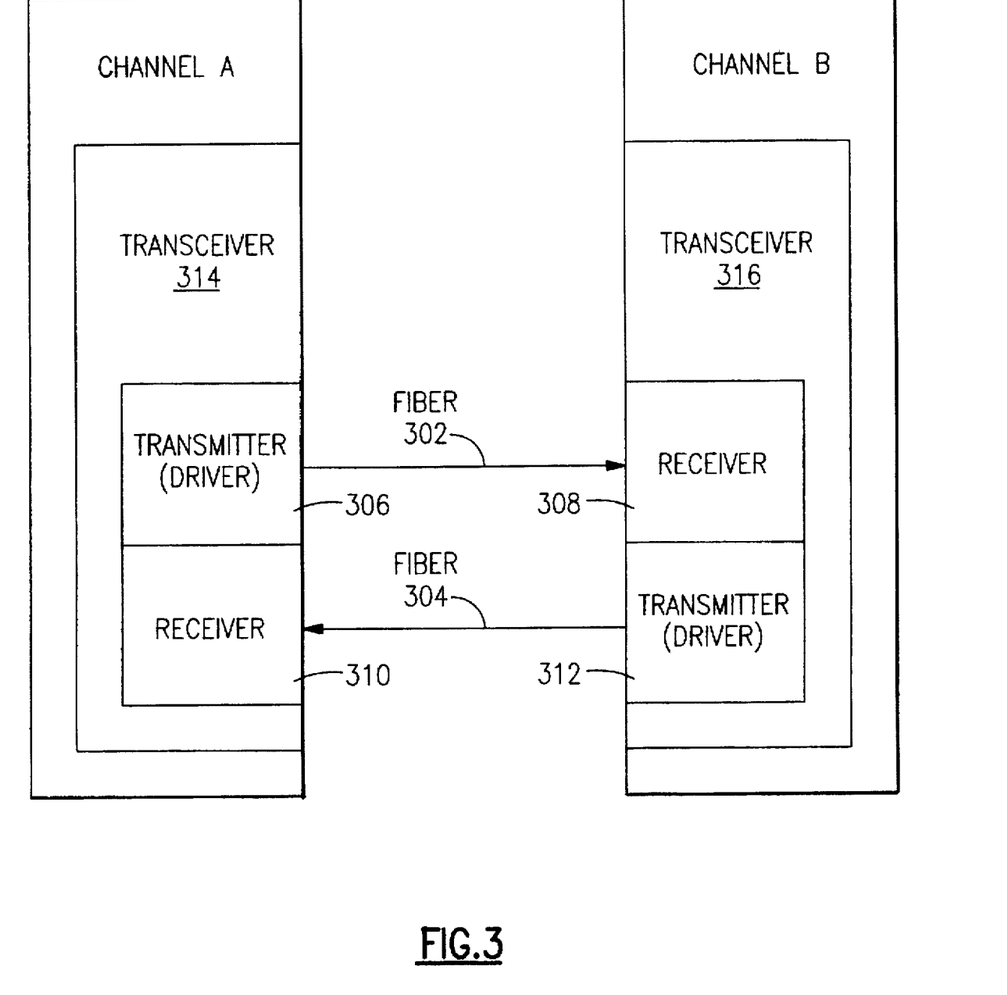
FIG. 3 depicts the connections between two channels of the system.

FIG. 3 depicts more detail of the physical attachment when the command initiator 104 is a channel within the channel system 208. Each of the physical links attached to a channel can contain a single conductor or be constructed from a number of conductors. In the present invention the conductors of the link are preferably fiber optic cable pairs that provide serial, bidirectional transfer of information between the units. Commonly assigned U.S. Pat. Nos. 5,003,558 and 5,025,458 are incorporated by reference herein for their showing of various aspects of a channel for synchronizing and decoding of serial data transmission between the systems 202 and, for example cf 218.

In FIG. 3, Channels A and B are shown as being connected by a single conductor, fiber-pair 302 and 304. The designation of A and B for the two channels depicted in this figure is solely for explanatory purposes. Although there are two fibers, 302 and 304, this fiber-pair can be considered a single conductor because both fibers are required for bidirectional communication. Each fiber in the system interconnects a driver at one end and a receiver at the other end of the link. For example, fiber 302 connects transmitter 306 in Channel A with receiver 308 in Channel B (conversely fiber 304 connects driver 312 in Channel B with receiver 310 in Channel A). A driver and receiver are paired in a channel in a device called a transceiver. In FIG. 3, transmitter 306 and receiver 310 form one transceiver. 314, while transmitter 312 and receiver 308 constitute a separate transceiver. 316, in Channel B. These interconnected transceivers allow for data to flow in one direction on one fiber (e.g. from Channel A to Channel B on fiber 302) and in the opposite direction on the other fiber (e.g. from Channel B to Channel A on fiber 304).

DESCRIPTION OF THE COUPLING FACILITY

Figure 4:
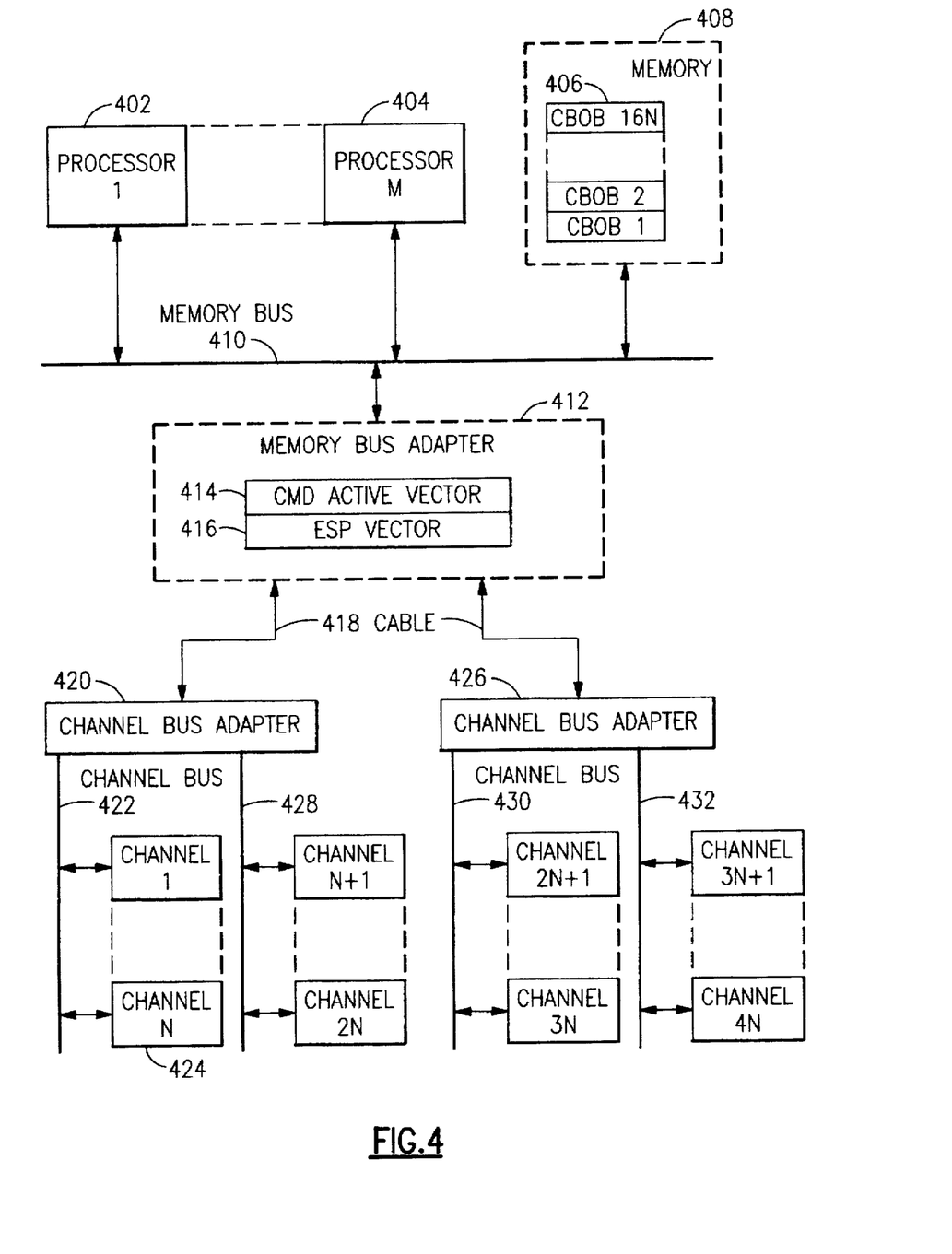
FIG. 4 is a block diagram of a coupling facility.

FIG. 4 is a block diagram of the hardware components of the coupling facility. A number of processors 402 to 404 are directly connected to intersystem channels by a memory interface including a common memory 408, a Memory Bus Adapter 412 (MBA), and a memory bus 410. The interface also includes a memory bus adapter 412 which contains two hardware vector elements, the command active vector 414 and the error state pending (ESP) vector 416. The adapter uses cables 418 as an interface to the external Channel Bus Adapter 420 (CBA). A number of intersystem channels (also simply channels) 424 may be connected to the channel bus 422 which is controlled by the Channel Bus Adapter 420. In this example of a typical coupling facility, two CBAs 420 and 426 are shown which support two channel buses each 422, 428, 430 and 432. Since each channel supports 2 primary channel buffers and 2 secondary channel buffers, a total of 4n channels are connected. Thereby a total of 8n primary and 8n secondary Channel Buffer Operation Blocks 406 (CBOB) are required. These CBOBs are in a protected area of the memory 408.

Figure 5:
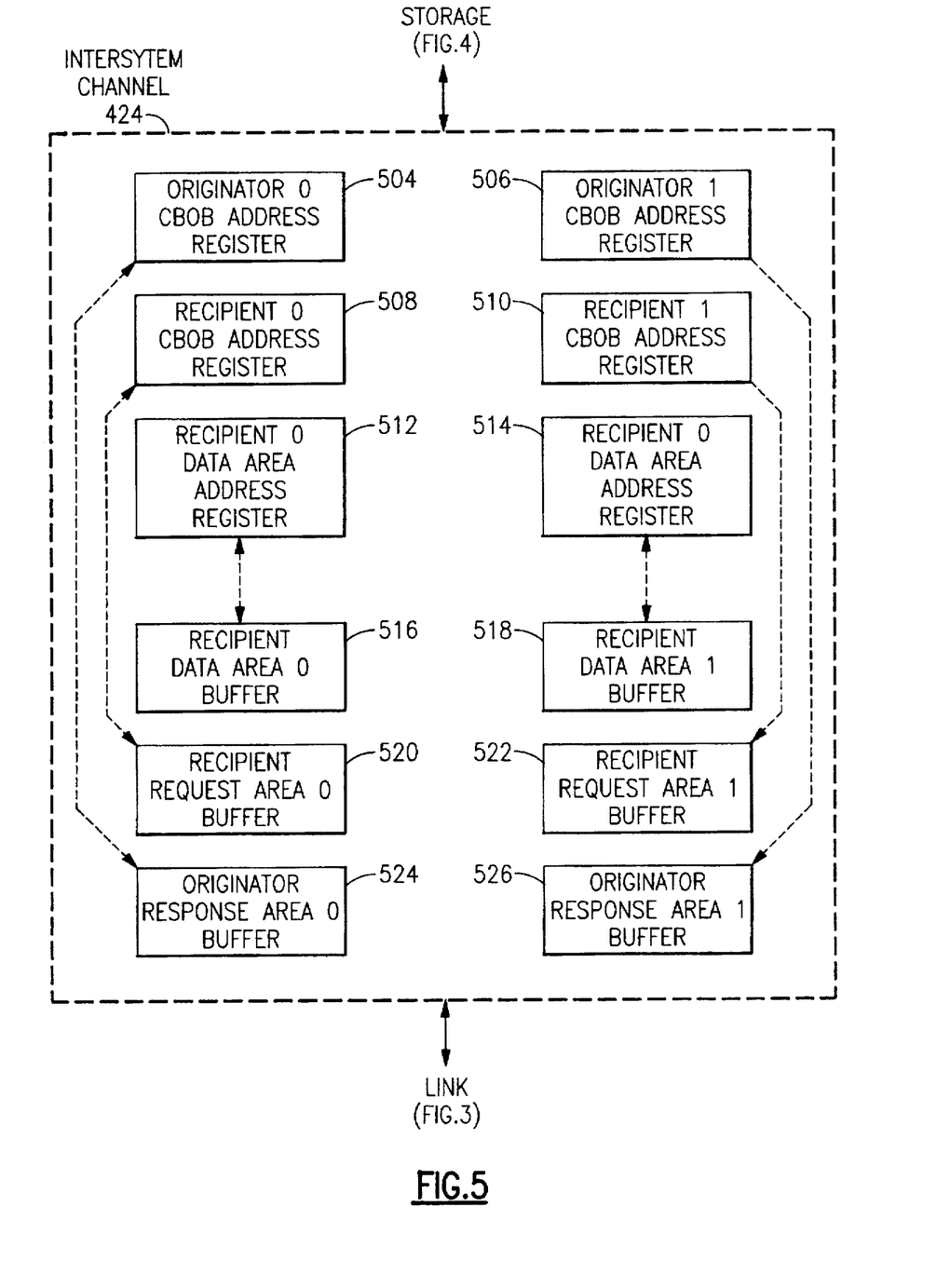
FIG. 5 depicts the elements of an intersystem channel.

FIG. 5 is a block diagram of the receive buffers in the intersystem channel 424 and the main processor storage address registers used to send and receive frames. The channel has four buffer sets, two originator buffer sets numbered 0 and 1 and two recipient buffer sets also numbered 0 and 1. Each of the two originator buffer sets has one receive buffer. Originator buffer set 0 has Originator Response Area 0 buffer 524, and Originator buffer set 1 has Originator Response Area 1 buffer 526. Each of the two Originator buffer sets also has a Channel Buffer Operation Block (CBOB) base address register. Originator buffer set 0 has the Originator 0 CBOB Base Address register 504, and originator buffer set 1 has the Originator 1 CBOB Base Address register 506. The contents of the CBOB are described later.

Each of the two recipient buffer sets has two receive buffers, one for requests and one for data areas. Recipient buffer set 0 has Recipient Request Area 0 buffer 520 and Recipient Data Area 0 buffer 516, and recipient buffer set 1 has Recipient Request Area 1 buffer 522 and Recipient Data Area 1 buffer 518. Each of the two recipient buffer sets has a CBOB base address register and an address register to control the data area. Recipient buffer set 0 has the Recipient 0 CBOB Base Address register 508, and recipient buffer set 1 has the Recipient 1 CBOB Base Address register 510. Also, recipient buffer set 0 has Recipient Data Area 0 Address register 512, and recipient buffer set 1 has Recipient Data Area 1 Address register 514.

Two bits in the command active vector 414 are associated with each channel, one for each primary buffer, and one bit in the ESP vector 416 is associated with each channel. The bits are set by hardware controls in the intersystem channel 424 and the Channel Bus Adapter 420 and are reset by sense commands issued by the processors 402–404. The arrival of a new command in a recipient request area buffer 520 or 522, causes the corresponding bit in the command active vector 414 to be set by the hardware controls. Similarly, any error condition detected by a channel causes the corresponding bit in the ESP vector 416 to be set by the hardware controls.

The propagation of the error state from the channel to the command active vector in the MBA allows for a significant improvement in the time required by a processor to sense a channel error. Prior art required a sense command to be sent through a high latency path consisting of the MBA 412, the cable 418, the CBA 420, the channel bus 422 and the intersystem channel 424, with a corresponding return path. The present invention allows the sense to read the error state directly in the MBA 412.

Figure 6:
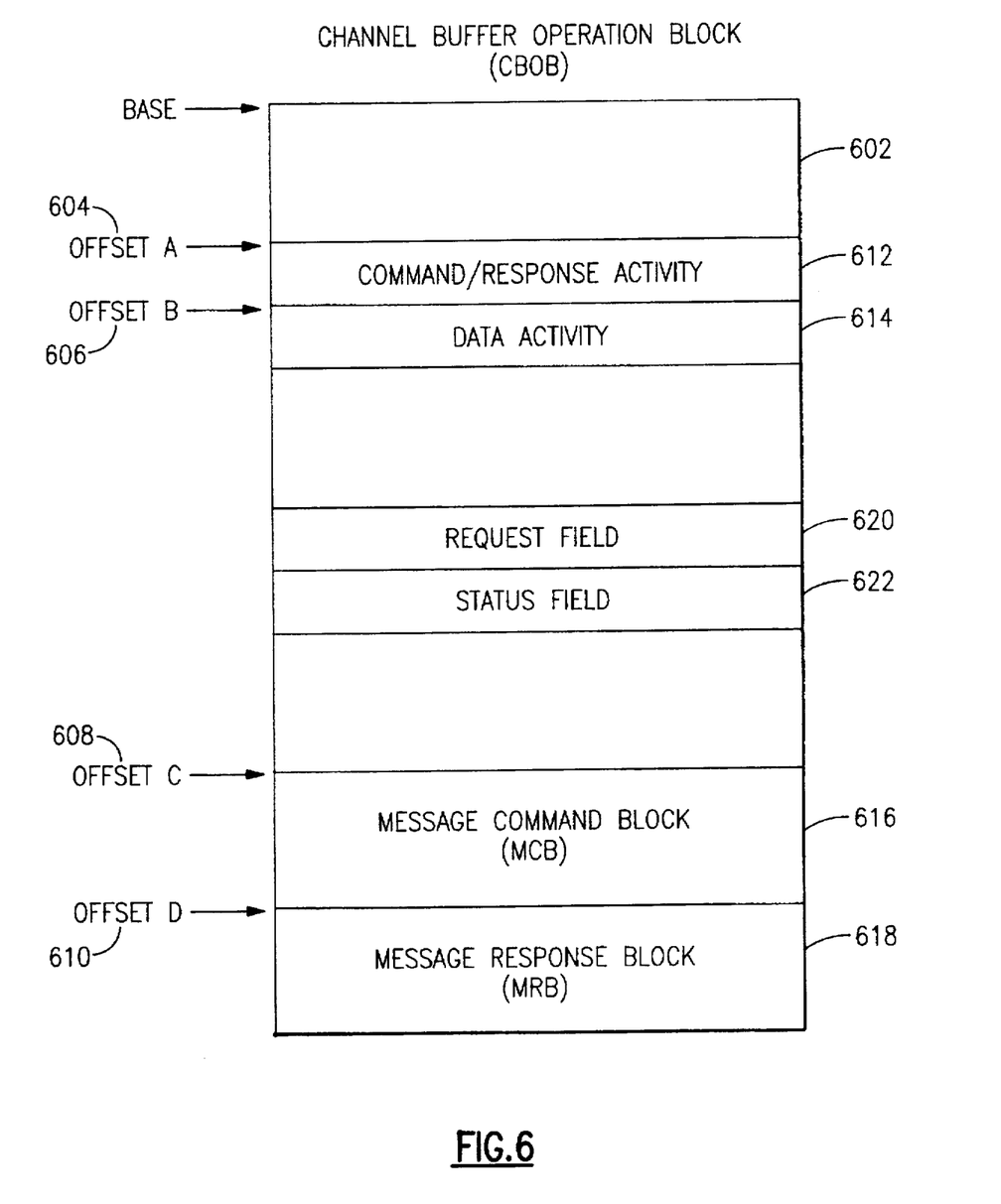
FIG. 6 describes the format of the channel buffer operation block (CBOB).

FIG. 6 shows the Channel Buffer Operation Block 602 (CBOB), and there is one CBOB located in main processor storage for each of the four buffer sets. Within each CBOB 602 there are four areas used to control the flow of information through the channel during normal operations. Each of these four areas is at a fixed offset from the base address of the CBOB 602. The Message Command Block (MCB) 616 and the Message Response Block (MRB) 618 are both stored in the CBOB 602 at fixed offsets C 608 and D 610, respectively, from the CBOB base address. The Command/Response Activity bit 612 is at offset A 604 and it indicates that there is either a valid MCB or MRB in the CBOB, depending on whether the CBOB is for an originator or recipient buffer set. The Data Activity bits 614 are at offset B 606, and they regulate the flow of data areas in both read and write operations.

When the channel is initialized, all four CBOB Address registers 504, 506, 508, and 510 are set by the Coupling Facility Control Program (CFCP). The two Data Area Address registers 512 and 514 change as the CFCP sends and receives data areas. The base addresses of the CBOBs are chosen to be on relatively large storage boundaries allowing the low order bits of the addresses to have a value of zero. For example, if the address is on a 1024 byte boundary, the low order ten bits would be zero. With large storage boundaries, the storage addresses for the MCB, MRB, Command/Response Activity bit, and the Data Activity bits can be computed by logically ORing the offsets to the base address. No hardware adder function is required.

PREPARE CHANNEL BUFFER

Figure 7:
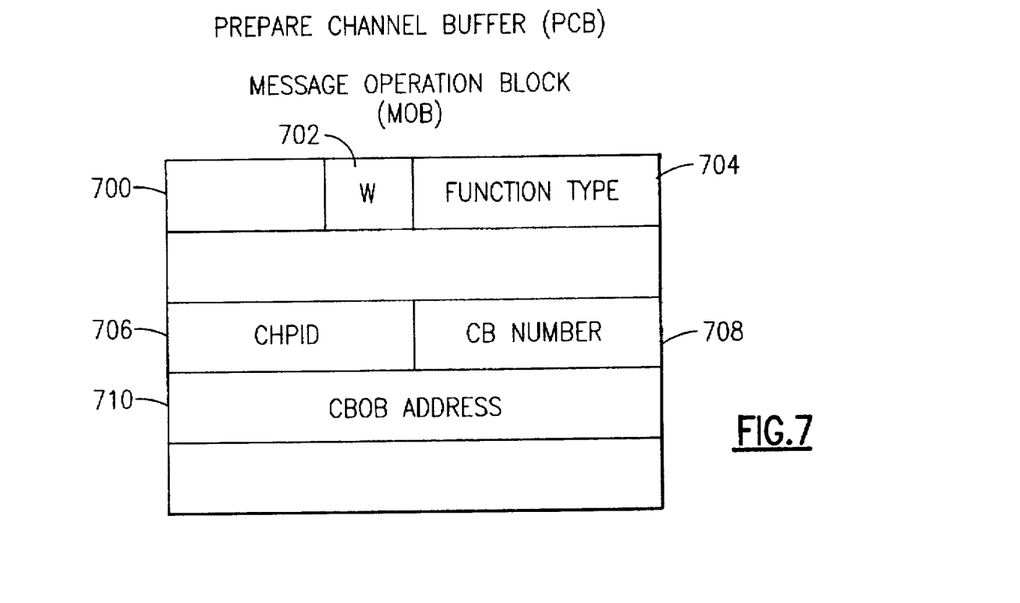
FIG. 7 describes the format of the message operation block for the PREPARE CHANNEL BUFFER instruction.

The Coupling Facility Control Program initializes the four CBOB addresses in the channel 504, 506, 508, and 510 by issuing a PREPARE CHANNEL BUFFER (PCB) instruction for each CBOB address register. Associated with the PCB instruction is a message operation block (MOB) which is depicted in FIG. 7. The MOB 700 contains a number of parameters: a valid bit W 702, a function type 704 which denotes the CBOB as either a primary channel buffer or a secondary channel buffer, the CHPID 706 which identifies the channel, the channel buffer (CB) number 708 which identifies the buffer 0 or buffer 1 within the channel, and the CBOB address 710 which is the value placed in the CBOB address register and points to a location in the memory 406. The combination of the function type and the channel buffer number identify the specific CBOB address register. A function type of primary associates the channel buffer with a recipient request area, and a function type of secondary associates the channel buffer with an originator response area. As an example, a PCB instruction with a function type of primary and channel buffer number of 0 will associate the channel buffer with recipient request area 0 520 and the CBOB address will be placed in the CBOB address area for recipient 0 508. In a similar fashion, a PCB with function type secondary and buffer number 0 will associate the channel buffer with originator response area 0 524 and initialize the originator 0 CBOB address register 504. Likewise a primary and secondary channel buffer are associated with recipient request area 1 522, and originator response area 1 526 with the corresponding CBOB addresses placed in 510 and 506 respectively.

When a PREPARE CHANNEL BUFFER is executed, the CBOB address register for the specified channel buffer is initialized and additionally control values are stored in the CBOB, the channel buffer is marked as assigned to the channel path for future status reporting by the channel system and a channel buffer token is returned to the CFCP. The channel buffer token is used by the CFCP when communication with the channel system is required. The token provides for fast lookup of controls associated with the hardware registers and buffers.

SIGNAL CHANNEL BUFFER

Figure 8:
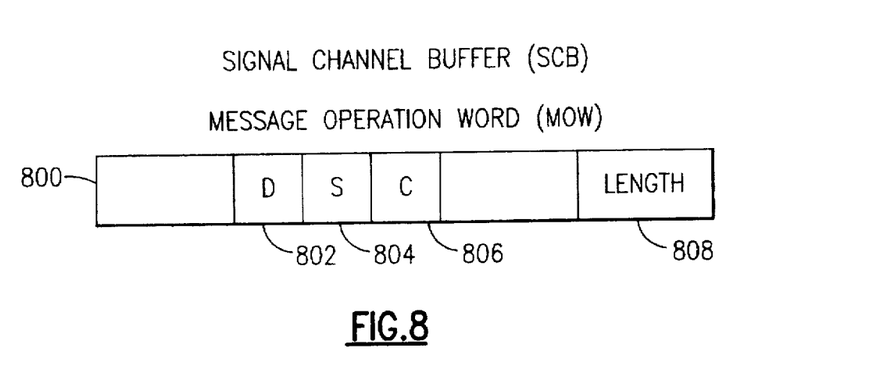
FIG. 8 describes the format of the message operation word for the SIGNAL CHANNEL BUFFER instruction.

The Coupling Facility Control Program sends the response to a primary command, sends a secondary command or receives the response to a secondary command by issuing a SIGNAL CHANNEL BUFFER (SCB) instruction for a specified channel buffer. Associated with the SCB instruction are two operands; the channel buffer token returned by PREPARE CHANNEL BUFFER and a message operation word (MOW) which is depicted in FIG. 8. The MOW 800 contains a number of parameters; a discard buffer (D) bit 802, a send block (S) bit 804, a command block (C) bit 806, and a length (L) value 808. The discard buffer bit 802 is set when a secondary command is issued and indicates to the channel that upon reception of the response, the response active indicator should be set, but the contents of the response should be deleted. This optimizes the processing for secondary commands where the response consists of a simple acknowledgement of completion. The send-block bit 804 is set when a primary response or a secondary command is sent. In combination with the setting of the command bit 806, the hardware is informed as to whether the block being set is a secondary command (S=1 and C=1) or is a primary response (S=1 and C=0). Likewise, a secondary response is received when the combination is S=0 and C=0. The combination S=0 and C=1 is not allowed; the function of receiving the command is performed by the channel without program control. The length value 808 tells the channel how many bytes of information to move. The location the data is moved from or to is at a fixed offset within the CBOB. For instance, when a primary MRB is sent, the channel fetches the contents of the memory location at offset D 618 from the CBOB address. Similarly, a secondary command is fetched from offset C 616, a secondary response is stored at offset D 618, and a primary command is stored at offset C 616. In each case the CBOB address that is used is the address stored in the CBOB address registered 504, 506, 508, or 510 that was prepared for the channel buffer.

MOVE CHANNEL BUFFER DATA

Figure 9:
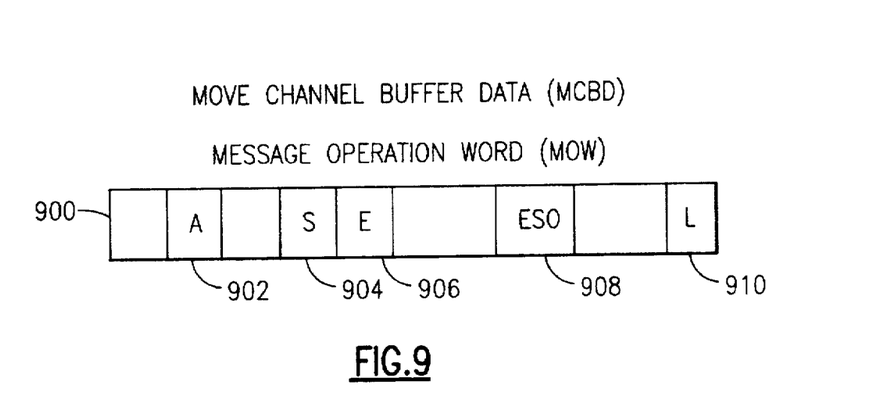
FIG. 9 describes the format of the message operation word for the MOVE CHANNEL BUFFER DATA instruction.

The Coupling Facility Control Program sends or receives data on a primary channel buffer by issuing a MOVE CHANNEL BUFFER DATA (MCBD) instruction for a specified primary channel buffer. Associated with the MCBD instruction are three operands; the channel buffer token returned by PREPARE CHANNEL BUFFER, the address of the data block in either main or expanded store, and a message operation word (MOW) which is depicted in FIG. 9. The MOW 900 contains a number of parameters; an associated data (A) bit 902, a send block (S) bit 904, an expanded store (E) bit 906, an expanded store offset (ESO) 908, and a length (L) value 910. The associated data bit 902 is set when another data block is to be sent or received after the current data block. When the data block is the only data block or the last data block to be sent or received, the A bit is zero. The send block bit 904 is set if the data is being sent from the coupling facility memory and is zero if the data is being received into the coupling facility memory. The E bit 906 indicates whether the data block address is a main store address or an expanded store address. When set, the address is an expanded store address and the ESO value 908 indicates the 256 byte offset within the specified expanded store block. The length value 910 specifies the number of bytes that are sent or received.

When executed the address of the data block in memory is placed in the recipient data area address register 512 or 514 and used by the channel during data transfer. In this way, the contents of the data area registers 512 and 514 are changed on each invocation of a data transfer operation.

TEST CHANNEL BUFFER

In certain conditions the channel system presents status in the channel buffer that is outside the normal execution of a command. In particular a retry of a transfer operation may be requested by placing a retry request into the request field 620 of the CBOB. Also, when errors occur during a transfer operation one of several status conditions may be set in the status field 622 of the CBOB. When status is presented the channel buffer is made status pending.

Figure 10:
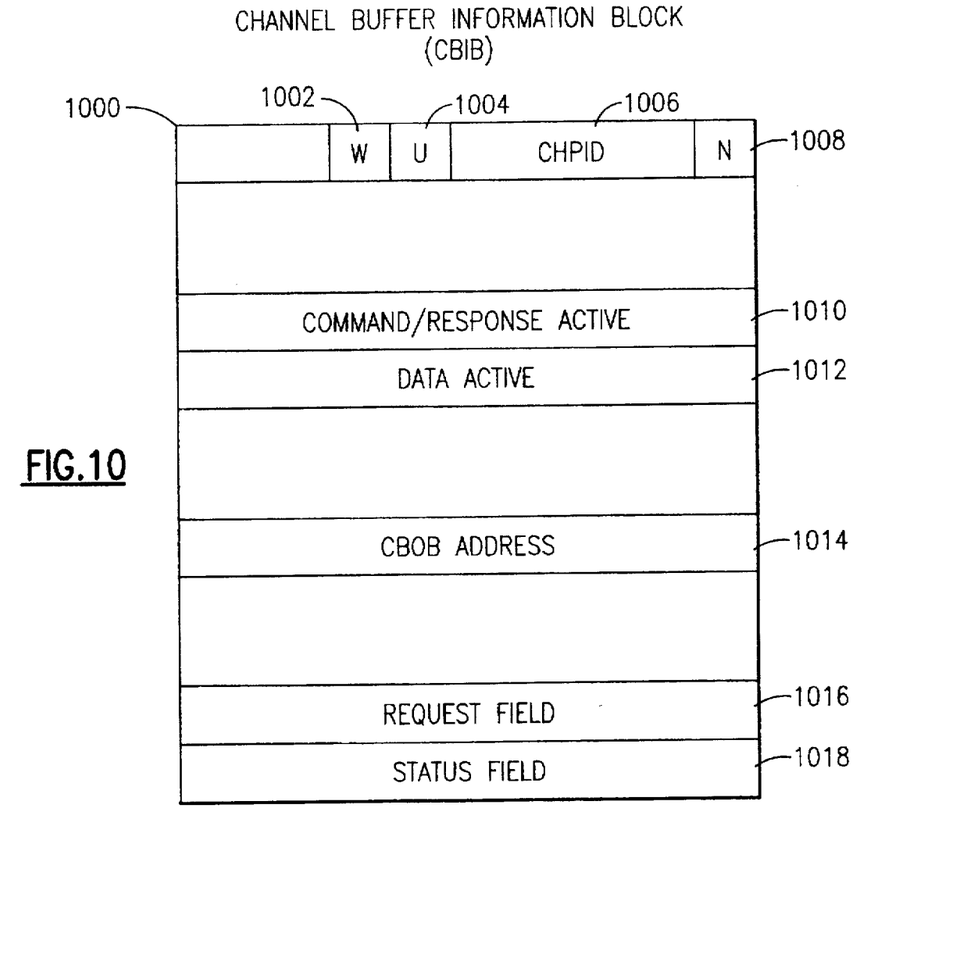
FIG. 10 describes the format of the channel buffer information bloc (CBIB).

The CFCP clears a request or status condition from the channel buffer by issuing a TEST CHANNEL BUFFER (TCB) instruction. In addition to clearing the conditions in the channel buffer, several fields are copied into the Channel Buffer Information Block (CBIB). The CBIB is depicted in FIG. 10 and includes several fields; the valid bit (W) 1002, the unprepared bit (U) 1004, the CHPID associated with the channel buffer 1006, the CB number 1008, the command/response active field 1010, the data active field 1012, the address of the CBOB 1014, the request field 1016, and the status field 1018.

Figure 11:
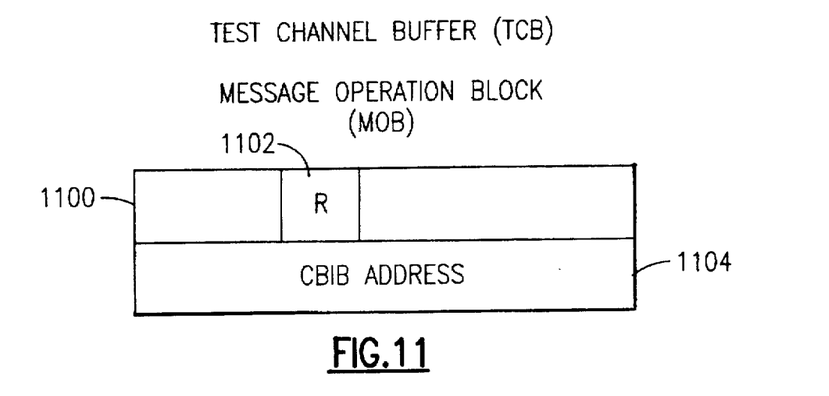
FIG. 11 describes the format of the message operation block for the TEST CHANNEL BUFFER instruction.

Associated with the TCB instruction are two operands; the channel buffer token returned by the PCB instruction and a message operation block (MOB) which is depicted in FIG. 11. The MOB 1100 contains two parameters; a receive function type (R) 1102 and a CBIB address 1104. The receive function type identifies whether the channel buffer selection is for the primary channel buffer or the secondary channel buffer.

LINK SEQUENCES FOR COMMAND, RESPONSE AND DATA TRANSFERS

Figure 12:
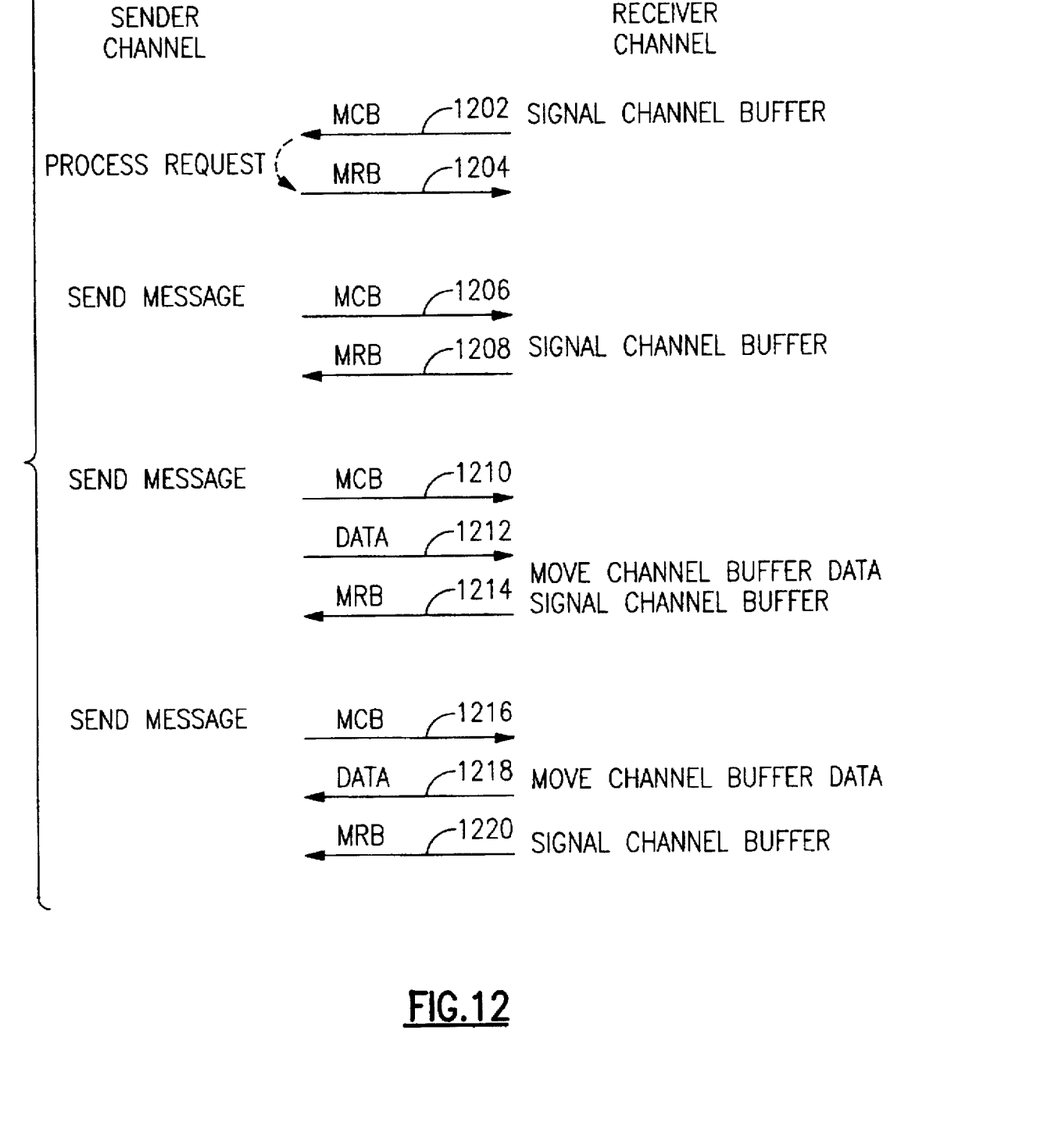
FIG. 12 illustrates sequences of command, data and response exchanges between the sender and receiver channels.

The simplest operational example is for an originator buffer set and is shown in FIG. 12. The CFCP sends a command by placing it in the CBOB MCB 616 and executing a SIGNAL CHANNEL BUFFER. This instruction tells the channel to send an MCB frame 1202 using the MCB in the CBOB. Recall that the CBOB address has previously been initialized. When the response is returned from the other end of the link in an MRB frame 1204, the channel stores the MRB in the CBOB and sets a bit in the Command/Response Activity 612 doubleword. Sometimes, the CFCP is only interested that the MRB has been returned; and the contents of the MRB are not important. To improve performance, when the CFCP does not want the channel to move the MRB to the CBOB, it sets the Discard bit when executing the SIGNAL CHANNEL BUFFER. This bit inhibits the channel from storing the MRB before it sets the Command/Response Activity bit.

The basic operation of the recipient buffer set is the same as the originator buffer set except that the MCB 1206 is received and CFCP responds by executing a SIGNAL CHANNEL BUFFER that sends the MRB frame 1208. More complicated operations requiring the movement of data areas show the other features of the channel. The first example involving data areas is a write operation to the CFCP where one data area is transferred. After the channel receives the MCB 1210, it moves it to the CBOB and sets the command-active-vector bit in the MBA. The CFCP detects the command-active-vector bit and starts to process the MCB. At the same time, a data area frame 1212 is most likely being received by the channel. After the CFCP has determined where the data area should be stored in main processor storage, it executes a MOVE CHANNEL BUFFER DATA which specifies an address. This address is sent down to the Data Area Address register 512 or 514, and the channel stores the data area. When the channel has completed storing the data, it sets one of the Data Activity bits 614 (Final) indicating that all of the data area has been successfully received and stored. The CFCP then puts an MRB in the CBOB and executes a SIGNAL CHANNEL BUFFER that causes the channel to send the MRB frame 1214.

The second example involving data areas is a read operation from the CFCP where one data area is transferred. After the channel receives the MCB frame 1216, it moves it to the CBOB and sets the command-active-vector bit. The CFCP detects the command-active-vector bit and starts to process the MCB. The CFCP then sends the data area by executing a MOVE CHANNEL BUFFER DATA which specifies an address. This address is sent down to the Data Area Address register 512 or 514, and the channel fetches the data area and sends the data frame 1218 on the link. When the channel has completed fetching the data, it sets one of the Data Activity bits 614 (Final) indicating that all of the data area has been successfully fetched. The CFCP then puts an MRB in the CBOB and executes a SIGNAL CHANNEL BUFFER that causes the channel to send the MRB frame 1220.

Figure 13:
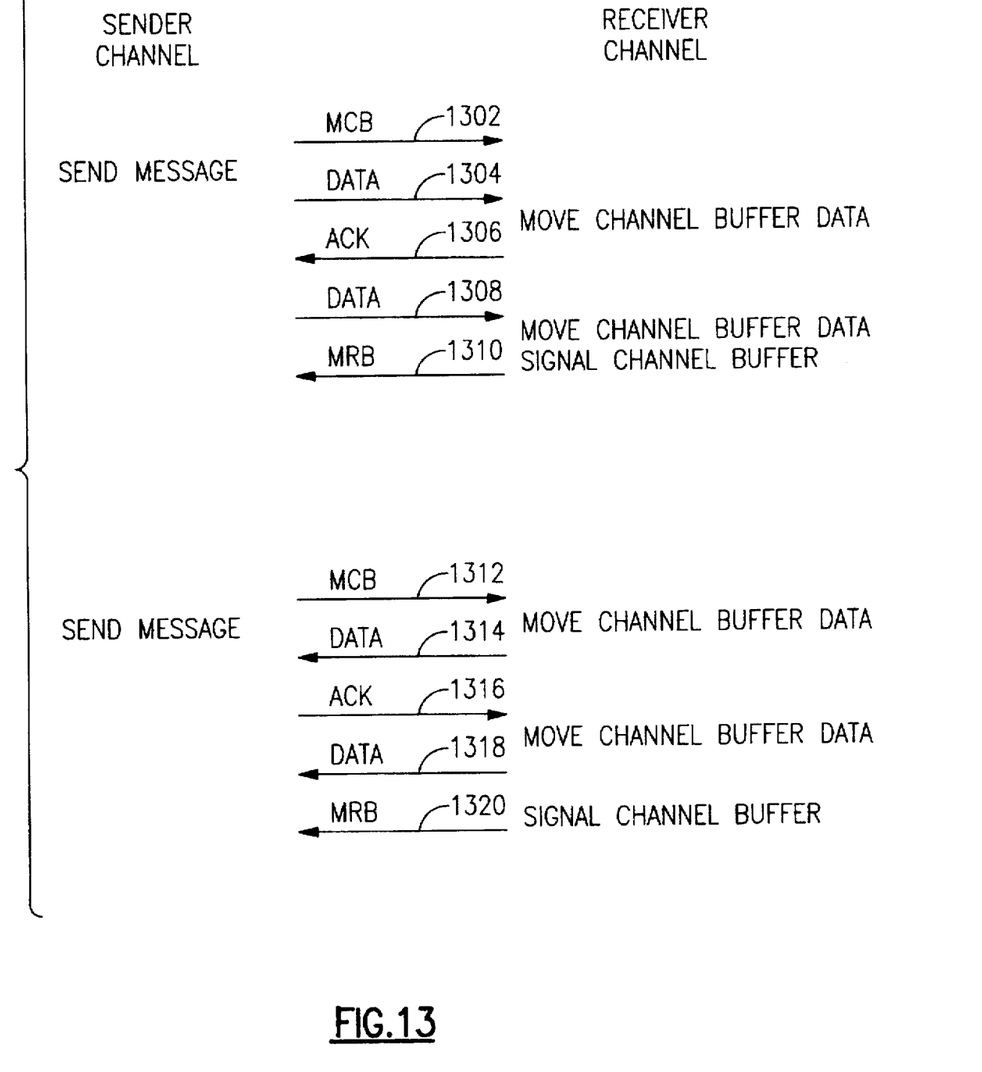
FIG. 13 illustrates additional sequences of command, data and response exchanges where multiple data transfers are performed.

The last two examples are moving multiple data areas, and these examples are shown in FIG. 13. In a multiple data area write operation, the channel receives the MCB 1302, moves it to the CBOB, and sets the command-active-vector bit. The CFCP detects the command-active-vector bit and starts to process, the MCB. At the same time, the first data area frame 1304 is most likely being received by the channel. After the CFCP has determined where the data area should be stored in main processor storage, it executes a MOVE CHANNEL BUFFER DATA which specifies an address. This address is sent down to the Data Area Address register 512 or 514, and the channel stores the data area. When the channel has completed storing the data, it sends an Acknowledge (ACK) frame 1306 and waits for the next and last data area to be received. After the next data area frame 1308 is received, the channel sets one of the Data Activity bits 614 (Intermediate) indicating that all of the first data area has been successfully received and stored and that the next data area frame 1308 has arrived. The CFCP executes another MOVE CHANNEL BUFFER DATA that moves the data area frame 408 to main processor storage. When the channel has completed storing the data, it sets one of the Data Activity bits 614 (Final) indicating that all of the data area has been successfully received and stored. The CFCP then puts an MRB in the CBOB and executes a SIGNAL CHANNEL BUFFER that causes the channel to send the MRB frame 1310.

The last example involving multiple data areas is a read operation from the CFCP. After the channel receives the MCB frame 1312, it moves it to the CBOB and sets the command-active-vector bit. The CFCP detects the command-active-vector bit and starts to process the MCB. The CFCP then sends the first data area by executing a MOVE CHANNEL BUFFER DATA which specifies an address. This address is sent down to the Data Area Address register 512 or 514, and the channel fetches the data area and sends the data frame 1314 on the link. When the channel has completed fetching the data, it waits to receive an Acknowledge frame 1316. After this frame is received, the channel sets the Data Activity bit (Intermediate) indicating that the first data area frame 1314 was received by the Sender Channel. The CFCP detects this bit and executes another MOVE CHANNEL BUFFER DATA to send the second data area. After this data area frame 1318 has been fetched, the channel sets one of the Data Activity bits (Final) indicating that all of the data area has been successfully fetched. The CFCP then puts an MRB in the CBOB and executes a SIGNAL CHANNEL BUFFER that causes the channel to send the MRB frame 1320.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. A computer system mechanism, comprising:

a coupling facility for providing a central data storage as well as a bidirectional control and data exchange pathway between a plurality of independent central processing units (CPUs) operating externally of said coupling facility, each one of said plurality of independent CPUs having a main memory, an operating system, and a communications interface form communicating with the coupling facility via an intersystem channel, said coupling facility including within said coupling facility, a plurality of separate coupling facility processors, a plurality of intersystem channels, interfaces for communicating with said plurality of independent CPUs, a coupling facility storage device for storing shared data which may be concurrently and commonly accessed by said plurality of independent CPUs operating externally of said coupling facility, and wherein any of said plurality of independent CPUs may store data in said coupling facility storage device and wherein said stored data may be retrieved by any of said plurality of independent CPUs including any of said plurality of independent CPUs which originally stored said stored data in said coupling facility storage device, a coupling facility memory interface between the coupling facility storage device and said plurality of intersystem channels, and a coupling facility control program for coupling said intersystem channels to said coupling facility storage device over said coupling facility memory interface, said coupling facility storing messages commands and data for coupling a particular intersystem channel and the coupling facility processors, each of which has data objects used to maintain state information for the shared data in the coupling facility storage device, said coupling facility memory interface having means for receiving primary message commands and data from any of said plurality of independent CPUs, for sending data and responses to the primary message commands, for sending secondary message commands originated by the coupling facility, triggered by the primary message commands, and for receiving responses to the secondary message commands from the plurality of independent CPUs, said coupling facility including a state information buffer control information operation memory block within said coupling facility storage device for describing a hardware communication environment associated with the computer system mechanism for storage of state information pertaining to communications buffers residing in said coupling facility memory interface, a set of address registers for said coupling facility memory interface, and wherein is employed, four instructions, PREPARE CHANNEL BUFFER, SIGNAL CHANNEL BUFFER, MOVE CHANNEL BUFFER DATA, and TEST CHANNEL BUFFER, for enabling said coupling facility control program to directly manipulate the address registers and control the flow of the data, message commands and responses directly between the coupling facility storage device and the plurality of independent CPUs.

2. A computer system mechanism according to claim 1, wherein said coupling facility memory interface provides a direct interface between the coupling facility processors, the coupling facility storage device and an intersystem channel for the sending and receipt of message commands, responses, and data.

3. A computer system mechanism according to claim 1 wherein a message command is moved by the coupling facility storage device interface directly into the coupling facility memory.

4. A computer system mechanism according to claim 1 wherein a response to a secondary message command is discarded by an intersystem channel following a signalling of the secondary message command's completion.

5. A computer system mechanism according to claim 1 wherein execution of a write command by a CPU is enabled to begin prior to the arrival of any data for a write command, or correspondingly, any data on a read command is allowed to begin transfer on a link to a CPU prior to sending a response.

6. A computer system mechanism according to claim 1 wherein said coupling facility specifies an address for data in a storage structure directly to allow data transfer to be accomplished without the need of a second movement of the data within coupling facility storage device.

7. A computer system mechanism according to claim 1 wherein said coupling facility specifies an address for data in a storage structure accessible to one of the CPUs directly to allow a data transfer to be accomplished without the need of a second movement of the data within coupling facility storage device.

8. A computer system mechanism according to claim 1 further comprising, an operating system control program for each of said CPUs, and a coupling facility memory interface for interconnecting said CPUs and said coupling facility storage device for said state information buffer control information operation memory block for describing the hardware communication environment.

9. A computer system mechanism according to claim 1 further comprising, an operating system control program for each of said CPUs, and a coupling facility memory interface for interconnecting said CPUs and said coupling facility storage device for said state information buffer control information operation memory block for describing the hardware communication environment, including a memory bus adapter and coupling facility channel bus adapters to which are coupled one or more channel busses to which are linked one or more intersystem channels.

10. A computer system mechanism according to claim 1 wherein said state information buffer control information operation memory block for describing the hardware communication environment stores the location of registers in said coupling facility storage device used to send and receive message commands, and where said coupling facility memory interface includes a plurality of registers used to send and receive message commands, and wherein said PREPARE CHANNEL BUFFER instruction is employed for preparing the transmission of message commands.

11. A computer system mechanism according to claim 1 wherein said PREPARE CHANNEL BUFFER instruction includes a validity field, a field indicating whether the instruction is for a primary or secondary message command, and a channel path field which identifies the associated channel by number, and a base address which points to a location in the state information buffer control information operation memory block within the coupling facility storage device accessible to a CPU.

12. A computer system mechanism according to claim 1 wherein said MOVE CHANNEL BUFFER DATA instruction utilizes a specified coupling facility storage device location as a staging area for movement of data between a channel buffer and an expanded storage.

13. A computer system mechanism according to claim 1 wherein said coupling facility memory interface has a memory bus adapter which includes an active vector and an error state pending vector for association which each intersystem channel.

14. A computer system mechanism according to claim 1 wherein said intersystem channel determines a location of a physical address for message command storage without program intervention.

15. A computer system mechanism according to claim 1 wherein a program run by one of said coupling facility processors detects a command activity originating with an intersystem channel, and builds a response and moves a response onto the intersystem channel with a SIGNAL CHANNEL BUFFER instruction.

16. A computer system mechanism according to claim 1 wherein a program run by one of said coupling facility processors detects data activity originating with an intersystem channel and a secondary message channel instruction is employed.

17. A computer system mechanism according to claim 1 wherein a primary message command employs a primary channel buffer and when a command arrives at the coupling facility a response is sent as an answer.

18. A computer system mechanism according to claim 1 wherein a primary message command employs a primary channel buffer and when a message command arrives at the coupling facility a responses is sent as an answer, and when data may be associated with a message command and when data is associated with a message command the message command is a write, and data may be associated with a response for a primary message command and when data is associated with a response the response is a read.

19. A computer system mechanism according to claim 1 wherein a secondary channel buffer of the coupling facility issues a secondary message command on a secondary buffer and receives a response issued by means of a SIGNAL CHANNEL BUFFER instruction.

20. A computer system mechanism according to claim 1 wherein a command for discard contains an indicator field indicating that a response is to be discarded, which causes the coupling facility to acknowledge the command and discard the response.

21. A computer system mechanism according to claim 1 wherein when an error is detected as occurring on link for said coupling facility memory interface, a retry request is made, and an instruction reissued to retry the link.

22. A computer system mechanism according to claim 1 wherein when an error occurs all command initiation on all coupling facility processors is suspended until the subsequent issuance of a sequence of instructions for a TEST CHANNEL BUFFER operation.

23. A computer system mechanism according to claim 1 wherein upon receipt of a message command a coupling facility processor scans the coupling facility storage device for intersystem channel activity and any next work to be performed, and when the work is assumed by the coupling facility processor the work is isolated to the coupling facility processor.

24. A computer system mechanism according to claim 1 wherein when the SIGNAL CHANNEL BUFFER instruction detects a status pending in the state information buffer control information operation memory block the response is discarded.

* * * * *